United States Patent

[11] 3,619,729

| [72] | Inventor | Arthur K. Littwin<br>Lincolnwood, Ill. |
|---|---|---|
| [21] | Appl. No. | 815,638 |
| [22] | Filed | Apr. 14, 1969 |
| [45] | Patented | Nov. 9, 1971 |
| [73] | Assignee | Littwin Family Trust No. 1<br>Chicago, Ill. |

[54] SOLID STATE ELECTRIC CIRCUIT FOR REVERSING POLARITY
10 Claims, 2 Drawing Figs.

[52] U.S. Cl. .................................................. 317/157.5, 179/100.2 D
[51] Int. Cl. .................................................. H01f 13/00
[50] Field of Search .......................................... 317/157.5; 321/47; 179/100.2 D

[56] References Cited
UNITED STATES PATENTS

| 3,454,862 | 7/1969 | Kurimura et al. | 321/47 X |
|---|---|---|---|
| 3,462,671 | 8/1969 | Lawn | 321/47 X |
| 3,525,921 | 8/1970 | Wattson | 321/47 X |
| 3,193,725 | 7/1965 | Skirpan | 323/22 X |
| 3,310,728 | 3/1967 | Jackson | 321/18 |
| 3,374,420 | 3/1968 | Weber, Jr. | 323/9 |
| 3,401,313 | 9/1968 | Littwin | 317/157.5 |

*Primary Examiner*—Robert K. Schaefer
*Assistant Examiner*—William J. Smith
*Attorney*—Paul H. Gallagher

ABSTRACT: Electric circuit for reversing polarity, by solid-state components and without physically or mechanically opening the circuit establishing the polarity, such as by switches.

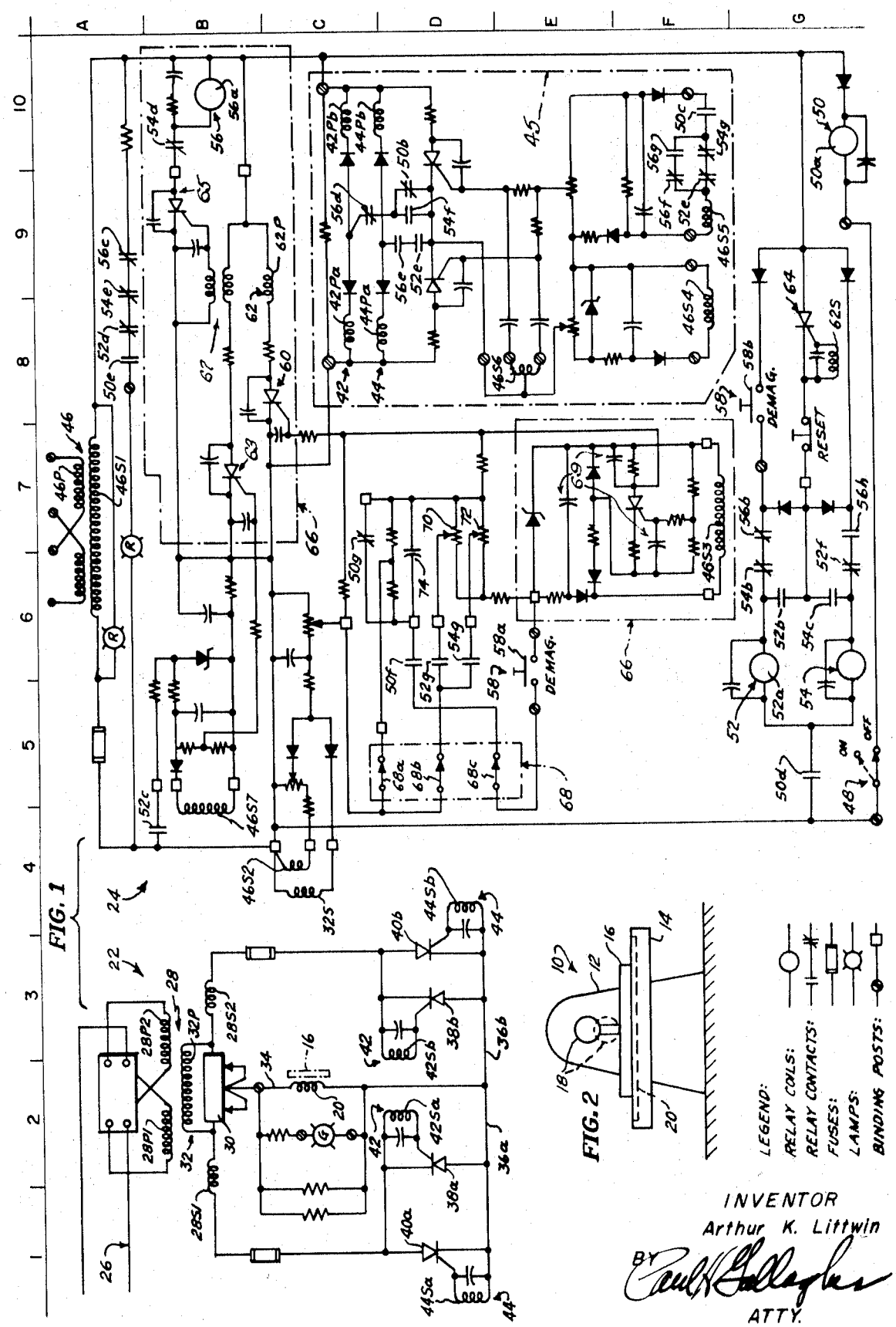

SOLID STATE ELECTRIC CIRCUIT FOR REVERSING POLARITY

OBJECTS OF THE INVENTION

A broad object of the invention is to provide an electrical circuit and means for controlling the current therein by reversing voltage without physically or mechanically opening the circuit establishing the voltage, such as by switches.

A principal adaptation of the invention is in connection with demagnetizing. For example, in the use of a magnetic chuck which is utilized for holding a workpiece in a machine tool, the chuck and the workpiece, upon deenergization, retain a substantial amount of residual magnetism, and in demagnetizing such chuck and workpiece, current is passed therethrough in opposite directions, by reversing the polarity, in a series of steps in which the voltage is reduced in the successive steps until a final step in which it is near zero, and the chuck and workpiece are thereby substantially demagnetized.

Another object of the invention is to provide means for so reversing the polarity and the direction of current as in a demagnetizing operation, without physically opening the circuit.

A still further object is to provide a circuit and means for reversing the polarity in an arrangement similar to the general description above by the utilization of solid state components.

A still further object is to provide an electrical circuit of the foregoing general character which is capable of accommodating magnetized articles, such as chucks and workpieces, by utilizing any voltage value within an exceedingly wide range.

A still further object is to provide an electric circuit of the character referred to above and means for reversing the polarity automatically at predetermined points of value that are produced by inductance of the article to be demagnetized, and thereby automatically triggering the apparatus for so reversing the voltage.

DESCRIPTION OF A PREFERRED EMBODIMENT

In the drawings:

FIG. 1 is a diagram of an electric circuit utilizing the invention; and

FIG. 2 is a semidiagrammatic view of a machine, such as a grinder, to which the invention is particularly adaptable.

Referring now in detail to the accompanying drawings, attention is directed first to FIG. 2 showing a machine tool 10, which in the present instance is a grinder having a body or stand 12 and a reciprocating table 14 thereon. The table is driven by any suitable means (not shown) in its reciprocating movements, and supports a workpiece 16 for correspondingly reciprocating it, for performing a working operation thereon, such as grinding by a grinding wheel 18 mounted in the body of the grinder. The workpiece 16 is held on the table 14 by means of a magnetic chuck 20 which may be embodied physically therein, and upon energization thereof functions to hold the workpiece in position in the grinding operation. The grinder including the table and the magnetic chuck therein as hereinabove described is known. The chuck 20 is preferably electromagnetically controlled, and it may be either a soft iron magnet, or a permanent magnet. Demagnetizing the electromagnet and the workpiece thereon, in its broad aspects has been done heretofore. The demagnetizing operation is normally conducted by reversing the current through the chuck and workpiece, by reversing the polarity in the circuit controlling it, in a series of steps in which the voltage is reduced at each reversed step to a final step in which the voltage is near zero and the chuck and workpiece are thereby substantially demagnetized.

The present invention is directed to a particular circuit arrangement for reversing polarity, and the consequent direction of current, such as is utilized in a demagnetizing operation, without physically opening the circuit, and more particularly by utilizing solid state components whereby the elements making up the circuit remain physically interconnected, and the polarity is reversed, and the direction of current reversed, by selectively turning on and off various solid state components, such as SCR's for directing the current through corresponding reversals of voltage and directions of the current. For convenience the SCR's may also be referred to by the generic term valve means, or controllable rectifiers.

The circuit diagram of FIG. 1 is provided with border coordinates for aiding in locating the individual elements referred to in the specification, these coordinates being indicated by letters in one direction and numerals in the other direction. The transformers in the circuit are identified by simple reference numerals and the primaries and secondaries thereof identified by the same reference numerals with the subscripts P and S respectively. In a similar manner relays are identified by simple reference numerals, and the coils thereof by the same reference numerals and the letter $a$, and the contacts thereof by the same reference numerals and the letters $b, c, d$, etc.

Referring now in detail to the circuit represented in FIG. 1, the circuit includes two main portions, a power circuit 22 (A-3) shown at the left and a control circuit 24 (A-4) constituting the remaining portion of the complete circuit. The power circuit includes the chuck 20 (C-2) represented as a coil in the circuit, adjacent which is indicated the workpiece 16. The power circuit 22 includes a line connection 26 (A-1) which may be of 115 volts AC source, and a transformer 28 (B-3).

The transformer 28 includes primaries $28P_1$, $28P_2$ and corresponding secondaries $28S_1$, $28S_2$. Between and in series with the secondaries is a center tap full wave rectifier 30, and parallel with the latter is the primary $32P$ of a transformer 32. The chuck 20 is in a conductor 34 leading from the rectifier 30, this conductor being connected with other conductors $36a$ (D-2) and $36b$ (D-3) returning to the secondaries $28S_1$, $28S_2$. Included in the conductors $36a$, $36b$ respectively are rectifier means including a first pair of SCR's $38a$ (D-2), $38b$ (D-3) and a second pair $40a$ (D-1), $40b$ (D-3). These SCR's function in automatically reversing polarity imposed on the chuck 20. The gates of the SCR's are controlled respectively by secondaries $42S_a$, $42S_b$, $44S_a$ and $44S_b$. The primaries of these transformers will be found at C-8, C-10 in a bias subcircuit 45, and the function thereof will be described hereinbelow.

The control circuit 24 includes a main transformer 46 (A-7) connected with a line source 26. It includes a primary $46P$ and secondaries, $46S_1$ immediately adjacent thereto, $46S_2$ (C-4), $42S_3$ (F-6), $46S_4$ (F-8), $46S_5$ (F-9), $46S_6$ (E-8) and $46S_7$ (B-4).

The control circuit includes a main switch 48 (G-5) which may be a switch incorporated in the grinder and utilized for controlling the grinding operation, as well as controlling the magnetization and demagnetization of the chuck. For example the switch 48 when in ON position in the control circuit 24 herein, as described below, is effective for maintaining the chuck 20 constantly energized or magnetized, for use in performing the grinding operation. For demagnetizing the chuck, the switch is thrown to OFF position, and when in this position a further manual manipulation is made and the demagnetizing operating is performed, as described fully hereinbelow.

The control circuit 24 also includes relays 50 (G-10), 52 (G-5), 54 (G-5), and 56 (B-10) with contacts correspondingly identified as referred to above.

When the switch 48 (G-5) is in ON position, as it may be for performing some other function, the relay 50 (G-10) is deenergized, enabling the contacts $50b$ (D-9) to close, and these contacts together with the contacts $56d$ (C-9) complete circuit through the transformer primaries $42P_a$ (C-8), $42P_b$ (C-10), correspondingly energizing the secondaries $42S_a$ (D-2), $42S_b$ (D-3) and these in turn, turn on the SCR's $38a$, $38b$ and maintain the chuck 20 energized or magnetized, holding the workpiece 16 in position for the grinding operation. It is left in such energized or magnetized condition throughout the grinding operation and to demagnetize it, the switch 48 (G-5) is thrown to OFF position and the DEMAG (demagnetizing) switch 58 (E-5, G-8) is manually depressed, this DEMAG switch or pushbutton including two sets of contacts 58a, 58b. Upon so moving the switch 48 to OFF position, the relay 50 (G-10) is energized, closing contacts 50c (F-10) and opening contacts 50b (D-9) as well as contacts 50d (G-5). A circuit is thereupon established through contacts 54b (G-6), 56b (G-7) and coil 52a (G-5). The coil 52a closes contacts 52b (G-6), setting up a holding circuit through the relay 52; additionally contacts 52c (B-4) are closed. Normally on SCR 60 (C-8) acts through transformer primary 62P (C-9) and secondary 62S (G-8) turns on another SCR 64 (G-8), and a circuit is then maintained through the relay 52. The SCR 60 (C-8) is included in a delay subcircuit 66 (C-7) along with the relay 56 (B-10), reversely oriented SCR's 63 (B-7) and 65 (B-9) and transformer 67 (B-9).

In the circuit as thus established, the contacts 50b (D-9) are open and the primaries 42Pa (C-8), 42Pb (C-10) deenergized, and the contacts 52e (D-9), 56e (D-9) are closed, energizing the other primaries 44Pa (C-8), 44Pb (C-10) and thus energizing the corresponding secondaries 44Sa (D-2), 44Sb (D-2). The polarity is thus reversed relative to the chuck 20 and upon a voltage drop across the center tap rectifier 30 (B-2) and a corresponding voltage drop across the primary 32P, a corresponding voltage is set up in the secondary 32S (C-4). The current thus provided through the secondary 32S opposes the current set up by the subcircuit 66 (F-6) which through a capacitor system 69 (E-7) holds on the SCR 60 (C-8). After the voltage provided by the capacitor system drops to a predetermined level, the current through the secondary 32S (C-4) takes over and shuts off the SCR 60, deenergizing the relay 52 (G-5). Thereupon contacts 52c (B-4) open, deenergizing the relay 56 (B-10) and enable contacts 56h (G-7) to open. After the resulting time delay, the contacts 52f (G-6) are permitted to close, and the contacts 56h (G-7) are closed, energizing the relay 54 (G-5) which then closes holding contacts 54c (G-6). The contacts 54f (D-9) and 56d (C-9) are thus closed, for energizing the primaries 42Pa (C-8), 42Pb (C-10), again reversing polarity to that existing before the first demagnetizing step. The relay contact 56b, 56h as will be noted are oppositely acting so that the coils 52a, 54a controlled thereby are alternately energized in the successive steps.

In the previous step the contacts 52f were held open and the contacts 56h held closed. Another demagnetizing step is thus performed, pursuant to the voltage drop across the center tap rectifier 30 (B-2) and the corresponding voltage drop across the primary 32P, acting through the secondary 32S (C-4), again performs the step of shutting off the SCR 60, as explained above.

In each step, the voltage set up in the capacitor system 69 (E-7) in the subcircuit 66 is reduced and correspondingly the voltage set up across the primary 32P is similarly reduced, so that a lesser voltage across the primary 32P is required at each successive step for overcoming the voltage in the capacitor system. As a consequence the voltage imposed in the chuck and the degree of magnetic saturation is reduced at each step until in a final step the voltage is at or very near zero.

The circuit also includes an arrangement for fast pulsing; for example if it is desired to quickly reduce the magnetism in the chuck and workpiece to check the workpiece during the course of the operation thereon, this can be done by means of switch means 68 (E-5) including elements 68a, 68b, 68c, bias adjusters 70, 72 (D-7) and a capacitor 74 (D-6). In the normal multipulse demagnetizing, as described above, the switches 68a and 68c are closed, and the switch 68b open, and for the fast pulsing, those switches are opened and the switch 68b closed. The bias adjusters are preset manually, one, e.g., 70, being set at a half range position and the other at a position at or close to zero. When the switch 68b is closed the bias adjusters 70, 72, and capacitor 74 are put in circuit, and the capacitor opposes the voltage in the secondary 32S (C-4) reducing in two steps, the degree of saturation of the chuck to a level close to zero, in a manner controlled as described above in connection with the multipulse operation, through the contacts 52g (D-6), 54g (D-6).

It will be appreciated of course that the apparatus is not limited to demagnetizing a chuck or workpiece, although it is particularly adaptable thereto, but may be used in any installation in which it is desired to alternately reverse voltage.

I claim:

1. Apparatus of the character disclosed for controlling current through an instrumentality, comprising, a source of AC, power circuit means connected with the AC source and including the instrumentality, control circuit means connected with the AC source, rectifier means in the power circuit for converting the AC to DC and applying to the instrumentality, said rectifier means including a first pair and a second pair of back-to-back controllable rectifiers, transformer means including primaries in the control circuit means and secondaries in the power circuit means individually related to and controlling the respective back-to-back rectifiers, and means responsive to the transformer primaries in the control circuit means for thereby controlling the respective secondaries and thereby controlling the controllable rectifiers and interrupting circuit to the instrumentality, the control circuit means through said transformer means being operative for reducing the degree of magnetism in the instrumentality in a series of steps.

2. Apparatus according to claim 1 and including means in the control circuit means operative for alternately reversing the voltage applied to the instrumentality and reducing the value of the voltage in successive steps whereby to reduce the level of magnetism in the instrumentality to a value near zero.

3. Apparatus of the character disclosed for controlling current through an instrumentality, comprising power circuit means including the instrumentality, an AC source, rectifier means for converting the AC to DC and imposing it on the instrumentality whereby the instrumentality becomes magnetized, said rectifier means including a first pair of back-to-back SCR's, transformer secondaries operative for controlling the energization of the SCR's, a second pair of back-to-back SCR's respectively associated with the first pair of SCR's, control circuit means, transformer means in the apparatus, including a secondary operatively controlling each of the rectifier means and a primary related to each secondary, the rectifier means being so interrelated that the said pairs thereof are operative for imposing DC voltage in respectively opposite directions in the instrumentality, means in the control circuit for alternately energizing the pairs of primaries and therethrough the secondaries and the rectifier means, respectively, in a succession of steps in which the voltage is reversed in successive steps, and means for reducing the value of the voltage in each successive step.

4. Apparatus according to claim 3 and including full wave rectifier means operatively connected with the instrumentality and second transformer means connected in parallel with the full wave rectifier means and operative for controlling the first mentioned pairs of transformer means, whereby to reduce the voltage imposed on the instrumentality in the successive steps.

5. Apparatus according to claim 3 and including capacitor means controlled by the instrumentality whereby to charge the capacitor means according to the value of the magnetism in each of said steps, whereby to correspondingly control the control circuit to impose progressively lesser values of voltage on the instrumentality.

6. Apparatus according to claim 4 and including second transformer means operatively responsive to the value of magnetism in the instrumentality for producing controlling current in the control circuit means, and further including capacitor means in the control circuit means having capacity sufficient to be charged during each step to a condition whereby to be operative for opposing the current produced in said second transformer means and thereby reduce the value of the current in successive steps.

7. Apparatus according to claim 6 and including relay means operative for establishing subcircuits for imposing respectively opposite polarity on the instrumentality, and wherein the control circuit includes means for delaying effective operative control condition of the respective relay means.

8. Apparatus according to claim 3 and including circuitry having first condition in which it is operative for controlling a continuous operation, the means for the step operation is deenergized, and having manually controlled means for placing the circuitry in second condition in which the means for the step operation is activated.

9. Apparatus according to claim 3 and including manually operative means for interrupting the means for reversing the voltage in said successive steps, and including means for fast pulsing for reducing the level of magnetism in the instrumentality in two steps.

10. Apparatus of the character disclosed for controlling the energization and magnetization of an object, comprising an AC source, power circuit means connected with the AC source and including said object, rectifier means for converting the AC to DC and imposing it on the object, said rectifier means including a first and a second pair of back-to-back SCR's respectively opposed, a first and a second pair of transformer secondaries controlling the respective SCR's, a full wave rectifier connected with the object and in series with the SCR's, a second transformer means having a primary connected across the full wave rectifier, the apparatus also including control circuit means which includes a first and a second pair of transformer primaries operatively associated with respective ones of the first pair and second pair of secondaries, the control circuit means having a first active condition, including means operative in its first active position or energizing the first pair of transformer primaries in constant condition whereby to impose DC in a predetermined direction on the object, the control circuit means including a first secondary associated with the first transformer, capacitor means energized by said second transformer secondary, a first and a second relay operatively associated with the first and second pair of first transformer primaries, means for alternately energizing the first and second relay for correspondingly energizing the the first and second pairs of transformer primaries for correspondingly reversing the voltage in the object, a third relay having contacts respectively associated with the first and second relays in opposite senses and operative when energized, and deenergized, for correspondingly energizing the first and second relays, control rectifier means in the control circuit means, the second transformer secondary and said capacitor means being operative for imposing control on the control rectifier means, the control rectifier means being operative for imposing control on the first and second relays, the capacitor means being energized by current established in said second transformer means and being opposed thereto, and the capacitor means having such capacity that upon discharge thereof it is energized, said control rectifier means in opposition to the current established in said second transformer secondary whereby to control the energization of said first and second relays alternately in a succession of steps and operative for correspondingly reducing the level of magnetism in the object in successive steps to a final step in which the level of magnetism is substantially zero.

* * * * *